(12) United States Patent
Sardo et al.

(10) Patent No.: US 11,612,170 B2
(45) Date of Patent: Mar. 28, 2023

(54) TREATMENT UNIT AND METHOD, UNIT FOR STORING AND CULTURING PLANT PRODUCTS COMPRISING THE TREATMENT UNIT

(71) Applicant: XEDA INTERNATIONAL S.A., Saint Andiol (FR)

(72) Inventors: Alberto Sardo, Chateaurenard (FR); Stefano Sardo, Chateaurenard (FR); Laura Paitel, Le Pontet (FR)

(73) Assignee: XEDA INTERNATIONAL S.A., Saint Andiol (FR)

( * ) Notice: Subject to any disclaimer, the term of this patent is extended or adjusted under 35 U.S.C. 154(b) by 129 days.

(21) Appl. No.: 16/627,018

(22) PCT Filed: Jun. 27, 2018

(86) PCT No.: PCT/EP2018/067320
§ 371 (c)(1),
(2) Date: Dec. 27, 2019

(87) PCT Pub. No.: WO2019/002405
PCT Pub. Date: Jan. 3, 2019

(65) Prior Publication Data
US 2020/0221719 A1 Jul. 16, 2020

(30) Foreign Application Priority Data
Jun. 28, 2017 (FR) ...................... 17 55964

(51) Int. Cl.
*A23B 7/152* (2006.01)
*A01M 7/00* (2006.01)
(Continued)

(52) U.S. Cl.
CPC .............. *A23B 7/152* (2013.01); *A01M 7/00* (2013.01); *A01M 17/008* (2013.01);
(Continued)

(58) Field of Classification Search
CPC ......... A01M 13/00; A01M 7/00; A23B 7/144; A23B 7/152; A23L 3/34095; A23L 3/3445; A23V 2002/00; B01B 1/005
See application file for complete search history.

(56) References Cited

U.S. PATENT DOCUMENTS 5,063,706 A    11/1991  Aki et al.
5,935,660 A    8/1999   Forsythe et al.
(Continued)

FOREIGN PATENT DOCUMENTS

CN    1346592 A     5/2002
EP    0775441 A1    5/1997
(Continued)

OTHER PUBLICATIONS

"Pyrethrins" Retrieved from the Merck Index: An Encyclopedia of Chemicals, Drugs, and Biologicals, Merck Research Laboratories, 2001, in 2 pages.
(Continued)

*Primary Examiner* — Brian A McCaig
(74) *Attorney, Agent, or Firm* — Knobbe, Martens, Olson & Bear, LLP (57) ABSTRACT

The treatment unit includes an evaporation device including a gas circulation pipe, and a material with a large specific surface filling an evaporation section of the circulation pipe; a device for circulating the gas through the circulation pipe; a liquid impregnating the material with a large specific surface, the liquid containing at least one product or a mixture of volatile biocide and/or phytoprotective products, with a boiling temperature between 130 and 280° C., the material with a large specific surface having a liquid retention capacity greater than 50 L/m³ of material with a large specific surface at 20° C.; a recharging device, arranged to re-impregnate the material with a large specific surface with liquid or to replace the spent material with a large specific (Continued)

surface with a new material with a large specific surface impregnated with liquid.

19 Claims, 9 Drawing Sheets

(51) Int. Cl.
  *A01M 17/00* (2006.01)
  *A23L 3/3409* (2006.01)
  *A23L 3/3445* (2006.01)
  *B01B 1/00* (2006.01)

(52) U.S. Cl.
  CPC ......... *A23L 3/3445* (2013.01); *A23L 3/34095* (2013.01); *A23V 2002/00* (2013.01); *B01B 1/005* (2013.01)

(56) References Cited

U.S. PATENT DOCUMENTS

| | | | |
|---|---|---|---|
| 2002/0062593 A1 | 5/2002 | Matsunaga et al. | |
| 2012/0328749 A1 | 12/2012 | Forsythe et al. | |
| 2013/0306158 A1 | 11/2013 | Sardo | |
| 2016/0030615 A1 | 2/2016 | Sardo | |
| 2017/0239466 A1* | 8/2017 | Cazares Delgadillo | A61L 9/00 |
| 2018/0199627 A1* | 7/2018 | Bowen | A24D 3/17 |

FOREIGN PATENT DOCUMENTS

| | | |
|---|---|---|
| JP | 57-118779 A | 7/1982 |
| JP | 2002-191279 A | 7/2002 |
| JP | 2004-236508 A | 8/2004 |
| JP | 2006-257105 A | 9/2006 |
| JP | 2007-143410 A | 6/2007 |
| JP | 2015-527897 A | 9/2015 |
| RU | 2 084 115 C1 | 7/1997 |
| RU | 2 167 523 C2 | 5/2001 |

OTHER PUBLICATIONS

Search Report of corresponding French Application No. FR 1755964—2 pages (dated Feb. 19, 2018).
International Search Report of International Application No. PCT/EP2018/067320—7 pages (dated Aug. 21, 2018).
"Pyrethrin", Wikipedia, <https://en.wikipedia.org/w/index.php?title=Pyrethrin&oldid=778428330>—8 pages (Feb. 16, 2018).

* cited by examiner

TREATMENT UNIT AND METHOD, UNIT FOR STORING AND CULTURING PLANT PRODUCTS COMPRISING THE TREATMENT UNIT

FIELD

The invention generally relates to the evaporation of volatile biocide or phytoprotective products.

BACKGROUND

It is possible to evaporate such products in an evaporation tower containing a liner. An upward air stream is created in the tower. The liquid to be evaporated is injected above the liner, and flows downward by gravity. It is collected at the foot of the tower, below the liner, and recirculated. The air stream circulates in the liner in contact with the liquid, the latter being evaporated and driven with the air stream.

Such a method is known from the application filed under number FR 1,655,717.

The device and the method described in this document work very well when the liquid is a pure product.

SUMMARY

Conversely, when the liquid comprises several products in a mixture, the most volatile products are preferably evaporated. The composition of the liquid is modified with time, the liquid becoming enriched in heavy products, and depleted in highly volatile products.

Thus, for liquids containing a plurality of products such as essential oils, the composition of the air stream charged with treatment products is modified with time.

In this context, according to a first aspect, the invention aims to propose a treatment unit that does not have the above flaw.

To that end, the invention relates to a treatment unit, the unit comprising:
- an evaporation device including a gas circulation pipe, and a material with a large specific surface filling an evaporation section of the circulation pipe;
- a device for circulating the gas through the circulation pipe;
- a liquid impregnating the material with a large specific surface, the liquid containing at least one product or a mixture of volatile biocide and/or phytoprotective products, with a boiling temperature between 130 and 280° C. at atmospheric pressure, the material with a large specific surface having a liquid retention capacity greater than 50 L/m$^3$ of material with a large specific surface at 20° C.;
- a recharging device, arranged to re-impregnate the material with a large specific surface with liquid or to replace the spent material with a large specific surface with a new material with a large specific surface impregnated with liquid.

The treatment unit implements a material with a large specific surface having a large retention capacity for the liquid to be evaporated. The contact surface obtained between the liquid and the gas is extremely large. It is thus possible to evaporate significant quantities of liquid, with a moderate gas stream flow rate.

In particular, it is possible to practically saturate the gas stream with the liquid vapor.

Due to the retention capacity of the material with a large specific surface, it is not necessary to recirculate the liquid continuously. When the material with a large specific surface is partially or completely spent in liquid, the recharging device makes it possible to re-impregnate the material with a large specific surface with fresh liquid.

Thus, the liquid depletion phenomenon in the highly volatile products observed with the treatment unit of FR 1,655,717 no longer occurs or is strictly limited. Because the material with a large specific surface is recharged periodically with fresh liquid, having the original composition, the composition of the evaporated vapor is constant, or evolves in a narrow composition range.

The unit may also have one or more of the features below, considered individually or according to any technical possible combination(s):
- at least one of the products is chosen from the list of the following phytoprotective or biocide products:
essential oil; terpene; saturated or unsaturated C6 to C10 short chain alcohol, for example octanol, 2-ethylhexanol; volatile synthetic product, for example hexanal, 1,4-dimethylnaphtalene and 3-decene-2-one; liquid organic acids with a high boiling point, such as pelargonic acid and parabanic acid; esters with biocide activity, for example isoamyl isovalerate;
- the evaporation device is a vertical axis tower, the evaporation section having a vertical axis and preferably having a horizontal section smaller than 75% of the horizontal section of the tower;
- the evaporation device is a hose defining the gas circulation pipe;
- the material with a large specific surface is an open-cell foam or is a divided mineral material such as vermiculite or perlite;
- the material with a large specific surface is arranged in at least two layers positioned one above the other and separated from one another by a space, each layer having a thickness smaller than a predetermined limit, for example 100 mm;
- the recharging device comprises a tub filled with liquid, and a mechanism arranged to remove the material with a large specific surface from the evaporation section of the circulation pipe, plunge it in the tub and return it to its place in the evaporation section of the circulation pipe;
- the tub is placed in the tower, the evaporation section being delimited between the tub and the wall of the tower;
- the recharging device comprises a nebulization device, injecting the liquid in the form of droplets into the gas upstream from the material with a large specific surface, preferably at a temperature below 50° C.;
- the recharging device comprises a reserve containing liquid, a liquid distributor, and a liquid circulation member suctioning the liquid in the reserve and discharging the liquid into the liquid distributor, the liquid distributor being arranged to spray the liquid on or in the material with a large specific surface;
- the recharging device comprises members arranged to mount the evaporation section reversibly in the circulation pipe.

According to a second aspect, the invention relates to a treatment method, the method comprising the following steps:
- circulating a gas through a circulation pipe, a material with a large specific surface filling an evaporation section of the circulation pipe, a liquid impregnating the material with a large specific surface, the liquid containing at least one product or a mixture of volatile biocide and/or phytoprotective products, with a boiling temperature between 130 and 280° C. at atmospheric pressure, the material with a large specific surface having a liquid retention capacity greater than 50 L/m$^3$ of material with a large specific surface at 20° C.;

when the material with a large specific surface is spent in liquid, recharging, by re-impregnating the material with a large specific surface with liquid, or replacing the spent material with a large specific surface with a new material with a large specific surface impregnated with liquid.

The method may further have one or more of the features below, considered individually or according to any technical possible combination(s):
- the material with a large specific surface is an open-cell foam or is a divided mineral material such as vermiculite or perlite;
- the re-impregnation of the material with a large specific surface is done by plunging the material with a large specific surface into a tub containing liquid;
- the passage pipe is arranged in a tower with a vertical axis, the tub being placed in the tower, the evaporation section of the passage pipe being delimited between the tub and the wall of the tower;
- the re-impregnation of the material with a large specific surface is done by injecting the liquid in the form of droplets into the gas upstream from the material with a large specific surface, preferably at a temperature below 50° C.;
- the re-impregnation of the material with a large specific surface is done by spraying liquid on or in the material with a large specific surface, from a liquid reserve;
- the recharging is done by disassembling the evaporation section containing the material with a spent large specific surface, replacing the material with a spent large specific surface with a new material with a large specific surface impregnated with liquid, and remounting the evaporation section containing a new material with a large specific surface impregnated with liquid;
- the recharging is done by disassembling the evaporation section containing the material with a spent large specific surface, and remounting a new evaporation section containing a new material with a large specific surface impregnated with liquid;
- the gas charged with vaporized liquid leaving the circulation pipe is injected into a location, containing plant products.

According to a third aspect, the invention relates to a unit for storing or growing plant products, comprising:

a location containing plant products;

a treatment unit having the above features, the gas circulation pipe being fluidly connected to the inner volume of the location.

BRIEF DESCRIPTION OF THE DRAWINGS

Other features and advantages of the invention will emerge from the detailed description thereof provided below, for information and non-limitingly, in reference to the appended figures, in which:

FIG. 1 is a simplified schematic illustration of a unit for storing plant products equipped with a treatment unit according to a first embodiment of the invention;

FIGS. 2 and 3 are views similar to those of FIG. 1, illustrating the step for recharging with liquid by re-impregnation of the material with a large specific surface for the first embodiment of the invention;

FIG. 4 illustrates an alternative of the first embodiment of the invention in which the treatment unit includes washing of the gases, before passing through the material with a large specific surface;

FIG. 5 is a view similar to that of FIG. 1, illustrating a second embodiment of the invention;

FIG. 6 illustrates a third embodiment of the invention, the location containing the plant products being a silo;

FIG. 7 is a view similar to that of FIG. 6, illustrating a fourth embodiment of the invention;

FIG. 8 is a view similar to that of FIG. 1, illustrating an alternative of the first embodiment of the invention;

FIG. 9 is a view similar to that of FIG. 1, illustrating still another alternative of the first embodiment of the invention.

DETAILED DESCRIPTION

The unit for storing or growing plant products 1 shown in FIG. 1 comprises a location 3 and a treatment unit 5. The treatment unit 5 is configured to evaporate a liquid containing at least one volatile biocide and/or phytoprotective product and for injecting the evaporated liquid into the atmosphere inside the location 3.

The treatment is a disinfecting treatment and/or a phytoprotective treatment.

For example, the location is substantially airtight. The location is a closed enclosure, in the sense that exchanges between the atmosphere of the location and the outside, in particular gaseous exchanges, are reduced, for example so as not to endanger the conservation of the plant products that will be stored therein.

Alternatively, the location is equipped with constant ventilation.

In the case of a disinfecting treatment, the location is for example storage intended for plant products, but not containing plant products at the time of treatment. Alternatively, the location is part of a hospital, a school, an industrial facility, or any other type of location. The location may also be a vessel, a storage or transport tank, or any other type of enclosure to be disinfected.

In the case of a phytoprotective treatment, the location is for example a room, a greenhouse, or any other location intended to store plant products such as cereal grains, fruits or vegetables. The treatment is applied while the plant products are stored on the location. Alternatively, it is applied while the location 3 is empty.

When the product is a biocide product, the treatment aims to sanitize the location 3.

When the product is a phytoprotective product, which may also be called phytosanitary product, the treatment seeks to protect the plant products 19 (see FIG. 1), by preventing the development of diseases and/or spoiling, and eliminating insects, fungi and parasites.

The treatment unit 5 comprises an evaporation device 7 provided with a gas circulation pipe 9, and a material with a large specific surface 11 filling an evaporation section 13 of the circulation pipe 9. The unit 5 also includes a device 15 for circulating the gas through the circulation pipe 9. The treatment unit 5 further includes liquid impregnating the material with a large specific surface, the liquid containing at least one product or a mixture of volatile biocide and/or phytoprotective products, as indicated above.

The unit 5 further includes a recharging device 17, arranged to re-impregnate the material with a large specific surface 11 with liquid or to replace the spent material with a large specific surface 11 with a new material with a large specific surface 11 impregnated with liquid.

The treatment unit 5 is placed outside the location 3 or inside it. The gas is typically atmospheric air suctioned from outside the location 3. Alternatively, the gas is the atmosphere inside the location 3.

The liquid contains only biocide products, or only phytoprotective products, or comprises one or several biocide products mixed with one or several phytoprotective products.

At least one of the products is chosen from the following list: essential oils; terpenes; saturated or unsaturated C6 to C10 short chain alcohols, for example octanol, 2-ethylhexanol; volatile synthetic products, for example hexanal, 1,4-dimethylnaphtalene and 3-decene-2-one; liquid organic acids with a high boiling point, such as pelargonic acid and parabanic acid; esters with biocide activity, for example isoamyl isovalerate.

The essential oil is for example chosen from the group made up of mint oil, clove oil, rose oil, thyme oil, oregano oil, *eucalyptus* oil, pine oil, cinnamon oil. Alternatively, the liquid comprises one of the components of these oils, chosen from among the group made up of L-carvone, eugenol, geraniol, thyol, carvacrol, eucalyptol, pinene, cinnamaldehyde.

Each biocide and/or phytoprotective product typically has a vapor pressure between 0.01 mm Hg and 3 mm Hg, i.e., between 1.3 and 400 Pa, at 20° C.

Typically, the liquid comprises only the product(s), without solvent or additive. Alternatively, the liquid includes an aqueous or organic solvent, in which the product(s) and one or several additives are dissolved. The aqueous solvent is for example water. The organic solvent is for example a solvent of the type described in FR 2,791,910 or glycols, diglycols and relative esters thereof. The additives are for example substances able to convey the active ingredient(s) or able to provide a dilution effect.

The or each product has a boiling temperature between 130 and 280° C. at atmospheric pressure.

The material with a large specific surface 11 is arranged so as to completely fill the section 13, such that the gases circling in the circulation pipe 9 are forced to pass through the material with a large specific surface 11.

The material with a large specific surface 11 is chosen so as to have a significant liquid retention capacity. It is chosen based on the nature of the liquid to be evaporated.

The material has a large surface per unit of volume, i.e., a large specific surface and therefore has a liquid retention capacity greater than 10 L/m$^3$ at 20° C. Preferably, the retention capacity is greater than 50 L/m$^3$ and still more preferably 100 L/m$^3$.

Advantageously, the material with a large specific surface 11 is an open-cell foam. The foam is a sponge, or a plastic foam. For example, the material with a large specific surface is an open-cell polyurethane foam, with a density between 10 and 40 kg/m$^3$, still more preferably between 20 and 30 kg/m$^3$, and for example a density of 25 kg/m$^3$.

Alternatively, the material with a large specific surface 11 is a divided mineral material, for example the form of small granules, such as vermiculite or perlite. For example, the material with a large specific surface 11 assumes the form of vermiculite pearls having a diameter between 0.5 and 5 mm, preferably between 0.5 and 2 mm, and for example equal to 1 mm.

According to another aspect, the material with a large specific surface offers an extremely large surface per volume. For example, the material with a large specific surface 11 has a surface per volume between 1000 and 100,000 m$^2$/m$^3$.

When the material with a large specific surface 11 is an open-cell foam, it has a surface per volume between 5,000 and 60,000 m$^2$/m$^3$, preferably between 10,000 and 40,000 m$^2$/m$^3$, and for example equal to 30,000 m$^2$/m$^3$.

When the material with a large specific surface assumes the form of small granules of a mineral material, its surface per volume is typically between 1000 and 10,000 m$^2$/m$^3$, preferably between 2000 and 6000 m$^2$/m$^3$, and is for example equal to 3500 m$^2$/m$^3$.

Figure 1:
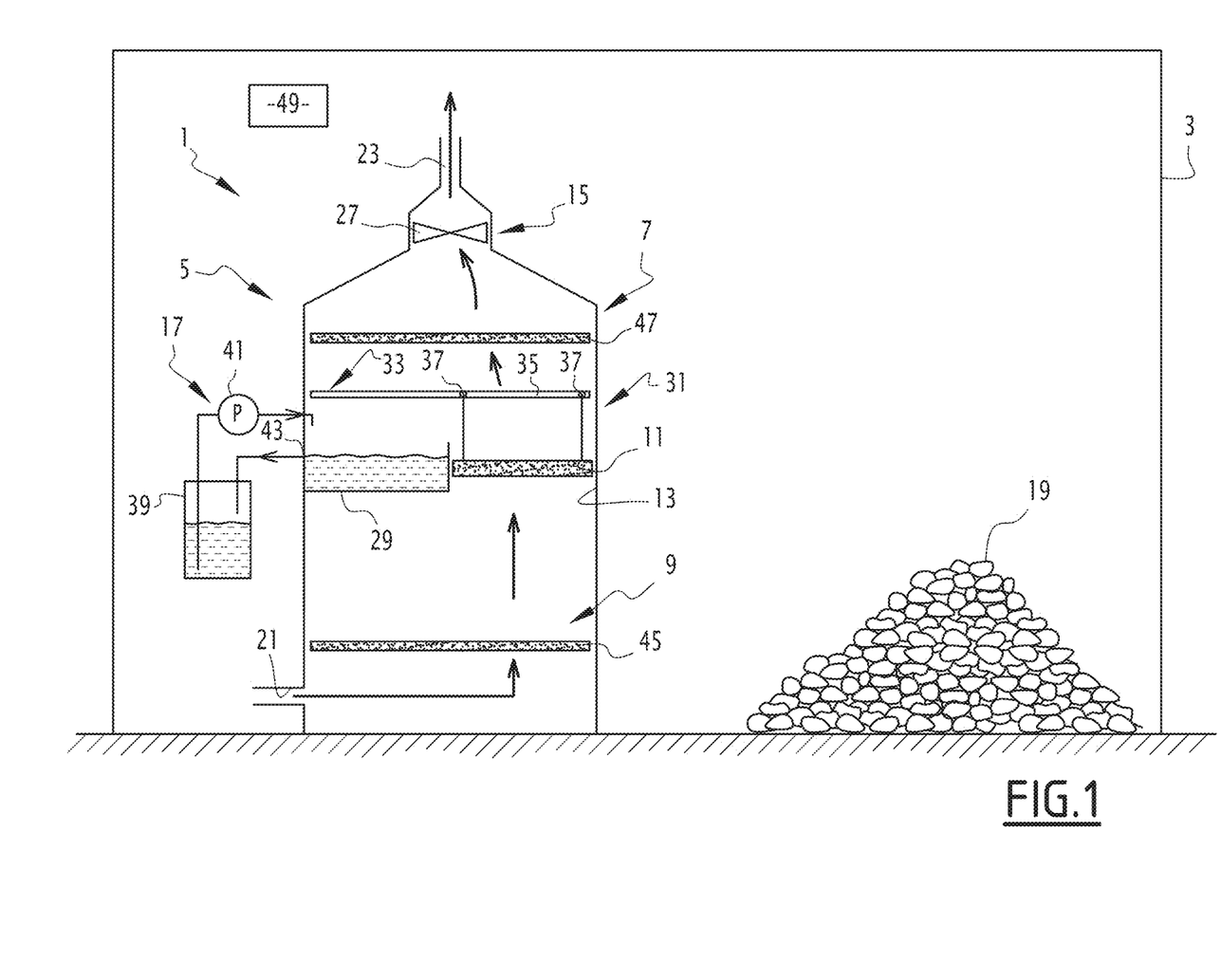

In the embodiment of FIG. 1, the evaporation device 7 is a vertical axis tower. The circulation pipe 9 also has a vertical axis. It corresponds to the inner volume of the tower. The evaporation section 13 also has a vertical axis.

The circulation device 15 is arranged to create an upward circulation of the gas inside the tower.

To that end, the evaporation device 5 includes one or several, inlets 21 through which the gas penetrates the evaporation device 5, under the material with a large specific surface 11. The inlets 21 for example emerge in the outside atmosphere.

The evaporation device 5 further includes an outlet 23 for the gas charged with evaporated liquid, placed in the upper part of the tower. The outlet 23 is located above the material with a large specific surface 11.

When the evaporation device is placed in the location 3, the outlet 23 emerges directly in the inner volume of the location 3 (see FIGS. 1 to 5, 8 and 9).

Figure 6:
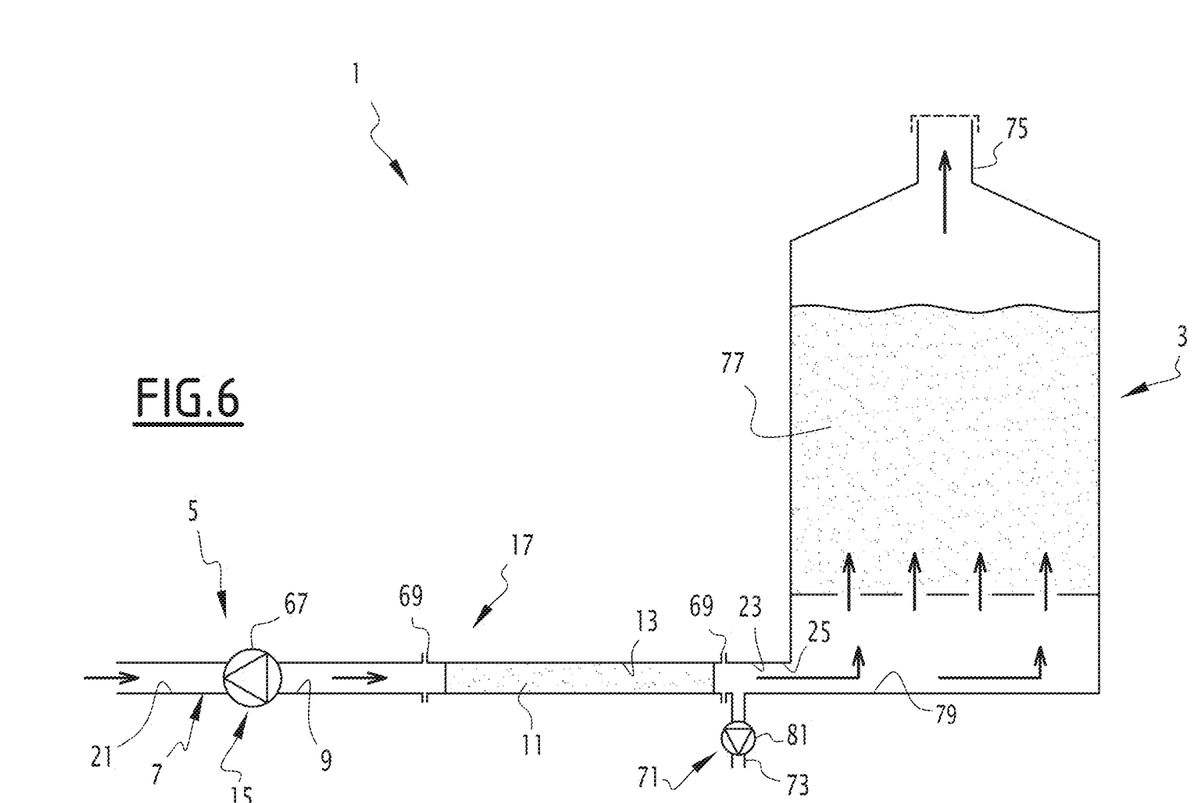
Figure 7:
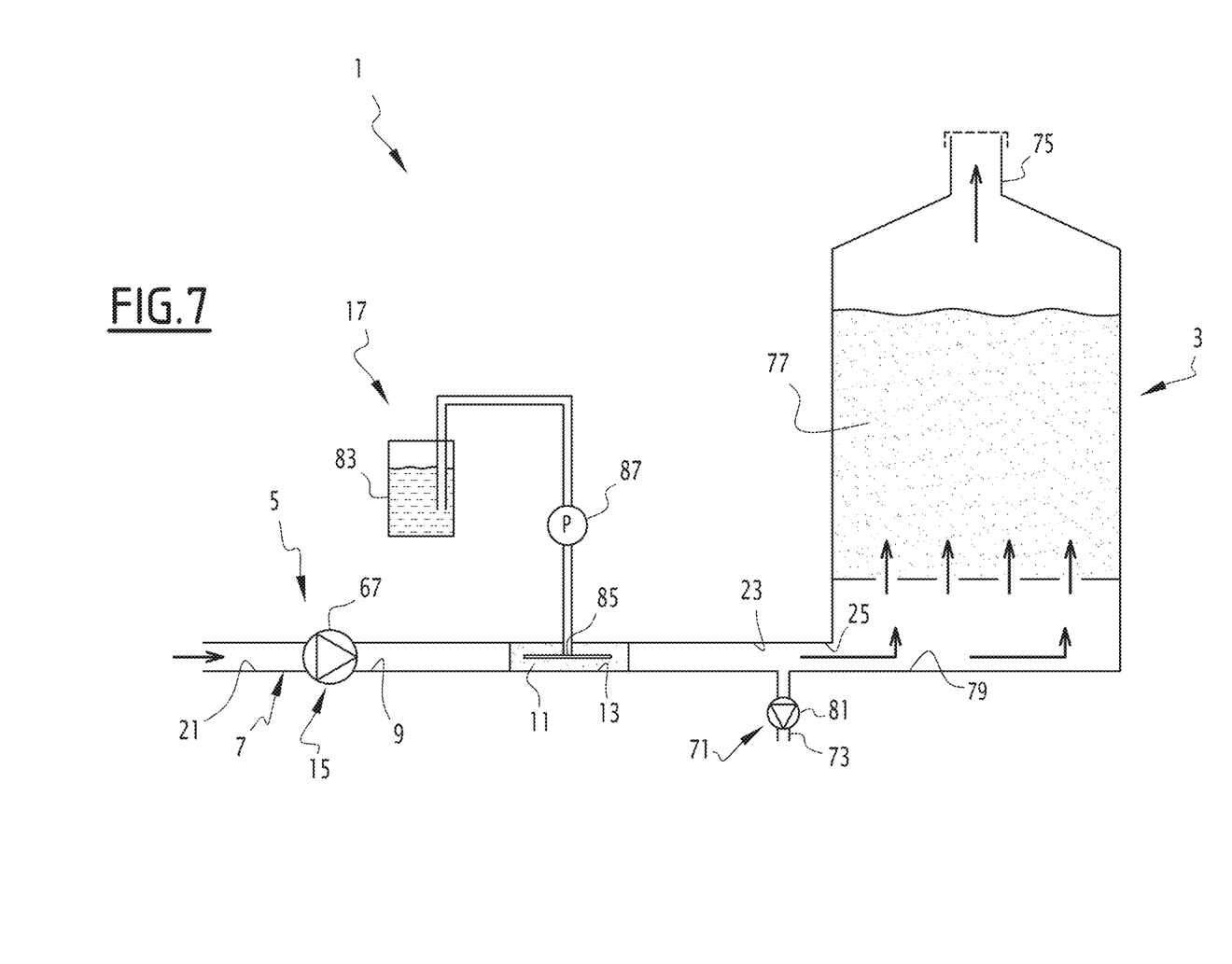

When the evaporation device is placed outside the location 3, the outlet 23 is fluidly connected to the inner volume of the location 3 by a transfer pipe 25 (FIGS. 6 and 7).

The circulation device 15 for example comprises a circulation member 27, such as a fan or blower, placed above the material with a large specific surface 11, typically at the apex of the tower. The circulation member 27 is arranged to suction the gas charged with evaporated liquid above the liner, and to discharge it in or toward the outlet 23.

Thus, the gas circulation pipe 9 extends from the inlet to the outlet inside the tower.

When the material with a large specific surface 11 is an open-cell foam, it assumes the form of a plate, with a shape substantially corresponding to the inner section of the evaporation section 13, and with a substantially constant thickness.

Typically, the thickness is between 30 and 50 mm.

When the material with a large specific surface 11 is made from a mineral material such as vermiculite pearls, the material with a large specific surface assumes the form of granules with a diameter from 1 to 5 mm.

The recharging device 17 typically comprises a tub 29 filled with liquid, and a mechanism 31 arranged to remove the material with a large specific surface 11 from the evaporation section 13 of the circulation pipe, plunge it in the tub 29 and return it to its place in the evaporation section 13 of the circulation pipe 9.

The tub 29 is advantageously placed inside the tower. It is typically open upwardly, so as to make it possible to insert material with a large specific surface 11 into the tub.

Advantageously, the evaporation section 13 of the circulation pipe 9 is delimited between the tub 29 and the wall of the tower.

Such an arrangement has several advantages.

The transfer of the material with a large specific surface 11 from the evaporation section into the tub 29 is made easier.

Furthermore, the evaporation section 13 constitutes a narrowing in the circulation pipe 9, such that the passage speed of the gas through the evaporation section and through the material with a large specific surface 11 is higher than in other parts of the tower. This is favorable for the evaporation of the liquid.

The evaporation section 13 thus has a smaller horizontal section, less than 75% of the horizontal section of the tower, preferably substantially equal to 50% of the horizontal section of the tower. The tub 29 then also has a section substantially equal to 50% of the horizontal section of the tower. The match between the respective sections of the material with a large specific surface and the tub allows easier dipping of the material with a large specific surface in the tub.

Typically, the horizontal section of the tub 29 is slightly larger than the horizontal section of the material with a large specific surface 11.

The tower typically has a rectangular section, considered in a horizontal plane. For example, it has a width equal to twice its length. The tub 29 and the evaporation section 13 are juxtaposed along the width of the tower.

The mechanism 31 is of any appropriate type. For example, it includes guide rails 33 and at least one carriage 35 arranged to move along the rails 33. The material with a large specific surface 11 is suspended from the carriage 35 via lifting members 37. The carriage 35 is arranged to move along the rails 33 between a first position located above the evaporation section 13 (FIG. 1), and a second position (FIGS. 2 and 3), located above the tub 29.

The lifting members 37 are for example winches. These lifting members are arranged so as, when the carriage 35 occupies the first position, to move the material with a large specific surface 11 between a low position (FIG. 1) in which the material with a large specific surface 11 is arranged in the evaporation section 13, and a high position, in which the material with a large specific surface 11 is removed from the evaporation section 13.

Figure 2:
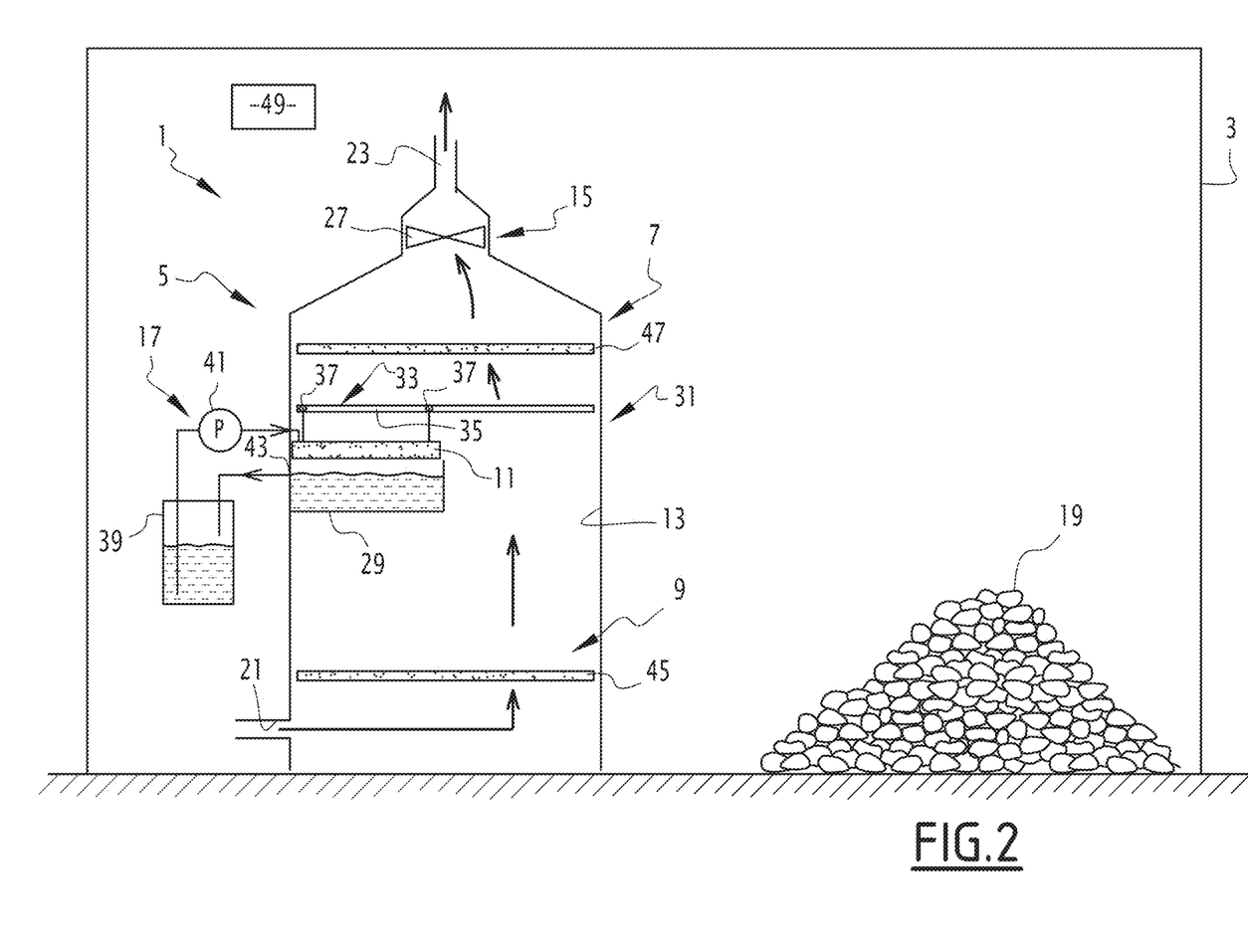
Figure 3:
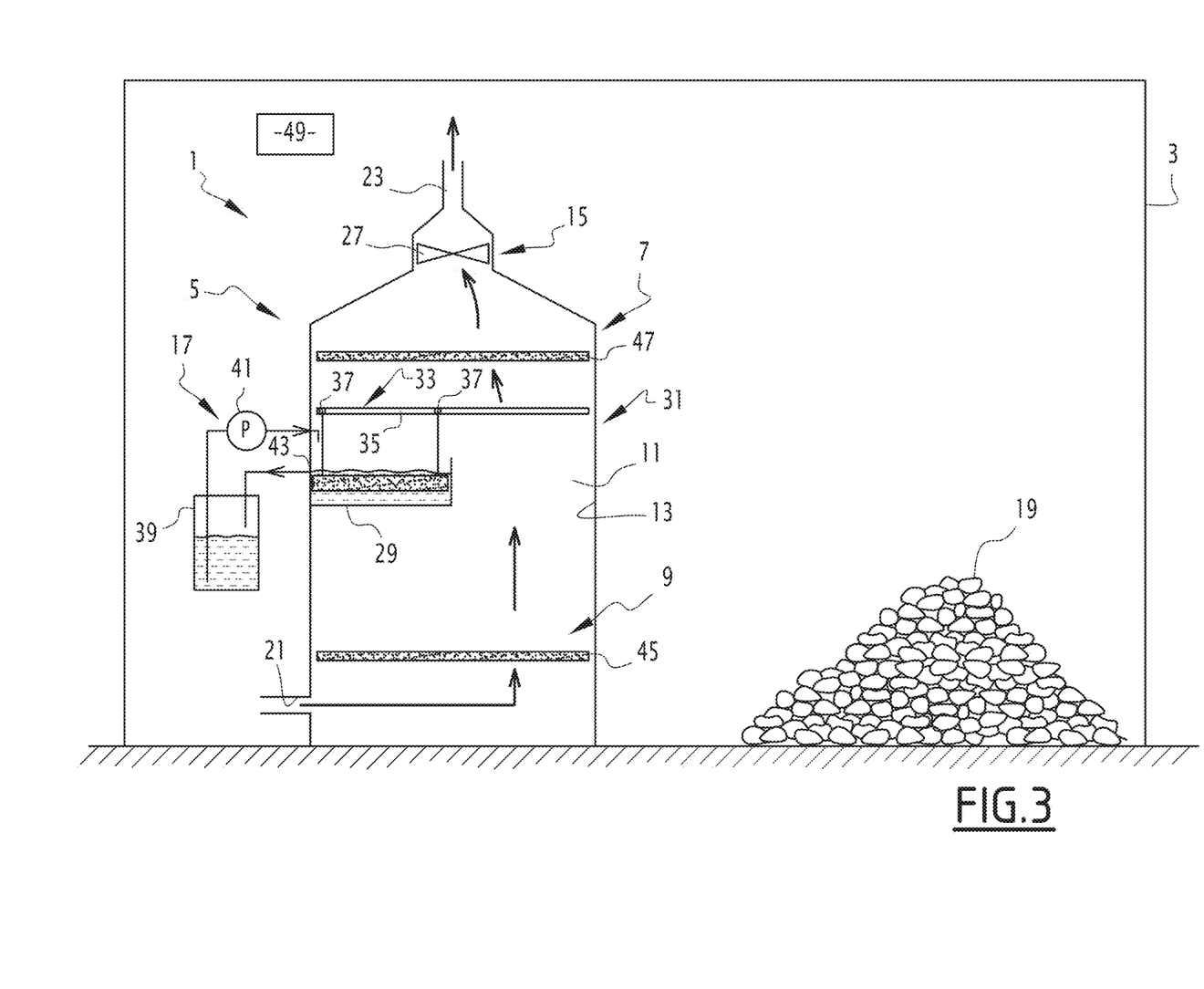

When the material with a large specific surface 11 is in the high position, it is able to be moved by the carriage 35 above the tub 29, as illustrated in FIG. 2. When the carriage 35 occupies the second position, the lifting members 37 are arranged so as to be able to lower the material with a large specific surface 11, so as to introduce the latter into the tub 29, as shown in FIG. 3.

The mechanism 31 is arranged to return the material with a large specific surface 11 into the evaporation section 13 according to an operating sequence opposite that just described.

The recharging device 17 preferably includes a vat 39 filled with liquid and a transfer member 41 such as a pump. The suction mechanism of the transfer member 41 is fluidly connected to the reservoir 39. The discharge mechanism of the transfer member 41 emerges above the tub 29. Furthermore, the tub 29 has an overflow mechanism 43, fluidly connected to the reservoir 39. The liquid suctioned by the transfer member 41 in the reservoir 39 is discharged into the tub 29. The liquid flows by gravity through the overflow mechanism 43 into the reservoir 39.

Advantageously, a lower plate 45 made from material with a large specific surface is arranged in the tower, below the material with a large specific surface 11. The lower plate 45 is for example made from the same material as the material with a large specific surface 11.

It is inserted vertically between the gas inlet 21 and the evaporation section 13. Typically, it occupies the entire section of the circulation pipe 9.

The lower plate 45 makes it possible to collect any drops of liquid falling from the material with a large specific surface 11. The gas is forced to traverse the lower plate before arriving at the material with a large specific surface 11, such that the liquid collected by the lower plate 45 is also evaporated.

Advantageously, the evaporation device 5 comprises an upper plate 47, placed above the material with a large specific surface 11. The upper plate 47 is typically made from the same material as the material with a large specific surface 11. It is inserted vertically between the material with a large specific surface 11 and the outlet 23.

It preferably occupies the entire section of the circulation pipe 9. Thus, the droplets that are driven by the gas stream circulating through the material with a large specific surface 11 are collected and stopped when the gas passes through the upper plate 47.

The treatment unit 5 advantageously includes a computer 49, controlling the recharging device 31. Advantageously, the computer 49 also controls the gas circulating device 15 and the transfer member 41.

In particular, the computer 49 is programmed to carry out the following steps periodically:
  removal of the material with a large specific surface 11 from the evaporation section 13 of the circulation pipe 9;
  plunging the material with a large specific surface 11 in the tub 29;
  placing the material with a large specific surface 11 in the evaporation section 13 of the passage pipe 9.

The computer 49 is programmed to control the recharging device 31 such that the step for removing the material with a large specific surface from the evaporation section 13 is carried out by lifting the material with a large specific surface 11 using lifting members 37, to its high position.

The computer 49 is also programmed so that the mechanism 31 carries out, in the step for plunging the material with a large specific surface 11 into the tub 29, the following sub-steps:
  moving the carriage 35 along the rails 33 from the first position to the second position;
  introducing the material with a large specific surface 11 into the tub 29, by moving the material with a large specific surface 11 downward using lifting members 37.

The material with a large specific surface 11 is moved downward until it is completely or partially dipped in the liquid filling the tub 29. The material with a large specific surface is then impregnated with the liquid.

The computer 49 is also programmed so that the mechanism 31 carries out the following sub-steps in the step for returning the material with a large specific surface to its place:
  removing the material with a large specific surface 11 from the tub 29 by moving it upward, using winches 37;
  moving the carriage 35, bearing the re-impregnated material with a large specific surface 11, from the second position above the tub to the first position above the evaporation section;
  moving the material with a large specific surface 11 downward, using lifting members 37, until the material with a large specific surface 11 is replaced in the passage section 13.

Figure 4:
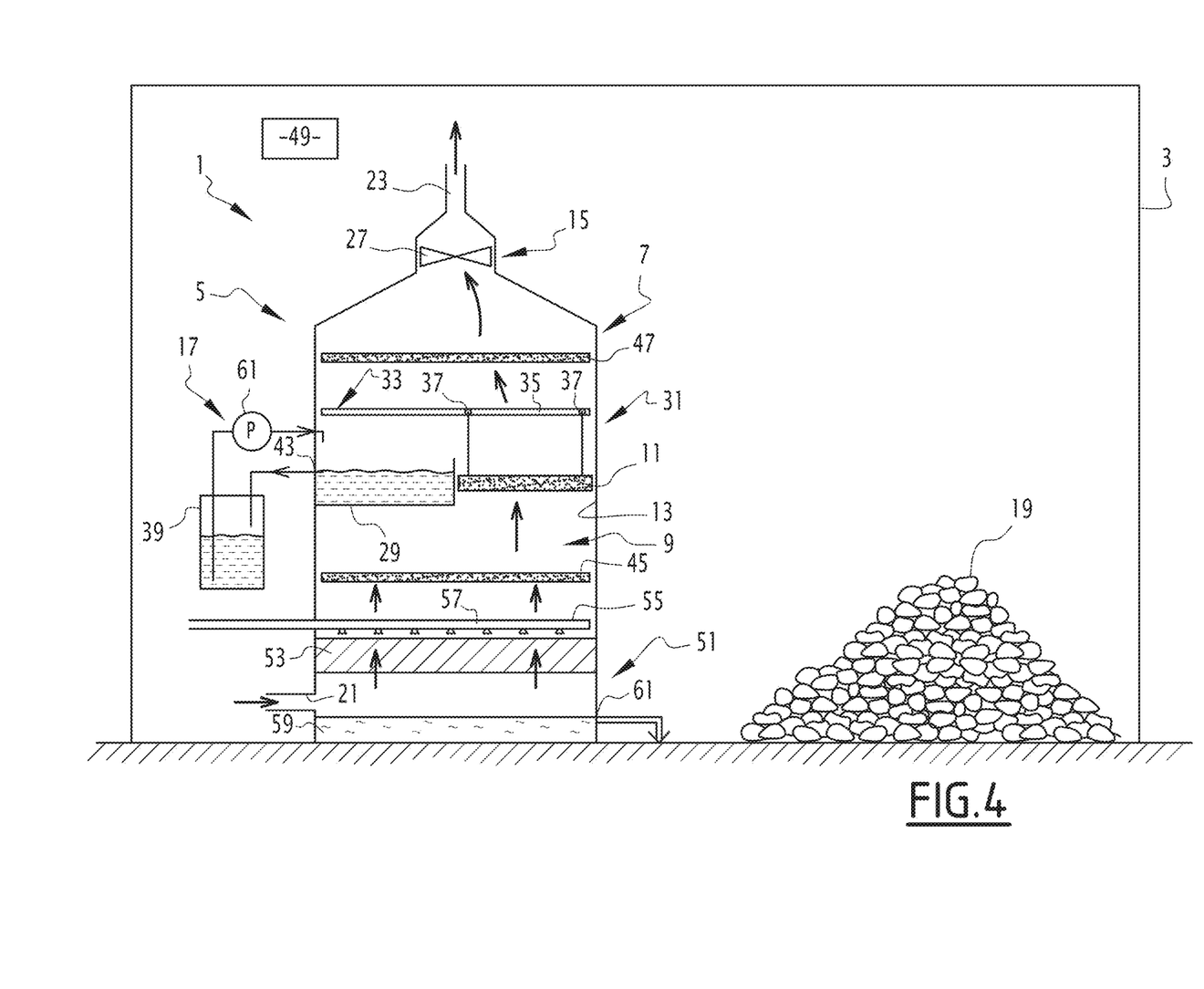

An alternative of the treatment unit 5 according to the first embodiment is shown in FIG. 4.

Only the differences between the treatment unit of FIG. 4 and that of FIGS. 1 to 3 will be outlined below.

Identical elements or elements performing the same functions will be designated using the same references.

The treatment unit 5 of FIG. 4 includes a washing device for the gases 51, arranged upstream from the evaporation device 7.

More specifically, the washing device 51 is installed in the lower part of the tower. It includes liner 53. The liner 53 is inserted vertically between the gas inlet 21 and the material with a large specific surface 11.

It is located below the lower plate 45, when the evaporation device includes one.

The washing device 51 further includes a washing liquid supply 55. The washing liquid is for example water, or water charged with an additive.

The supply 55 includes one or several members 57 configured to spray the washing liquid on the liner 53. The member 57 is for example a ramp bearing a plurality of spray nozzles. Each member 57 is located above the liner 53.

The washing device 51 further includes a collection tub 59, located at the bottom of the tower, below the liner 53. The or each inlet 21 emerges between the tub 59 and the liner 53. The gas penetrating through the inlets 21 circulates upward through the liner 53, while the washing liquid 57 streams by gravity downward through the liner 53.

The gas is thus placed in contact with the washing liquid while passing through the liner 53.

This step makes it possible to collect certain impurities contained in the gas, for example dust.

The washing liquid, charged with impurities, is collected in the tub 59, and for example discharged through an overflow mechanism 61. The washing liquid is recycled or discharged.

A second embodiment of the invention will now be described, in reference to FIG. 5.

Only the differences between the second embodiment and the first will be outlined below.

Elements that are identical or perform the same function in both embodiments will be designated using the same references.

Figure 5:
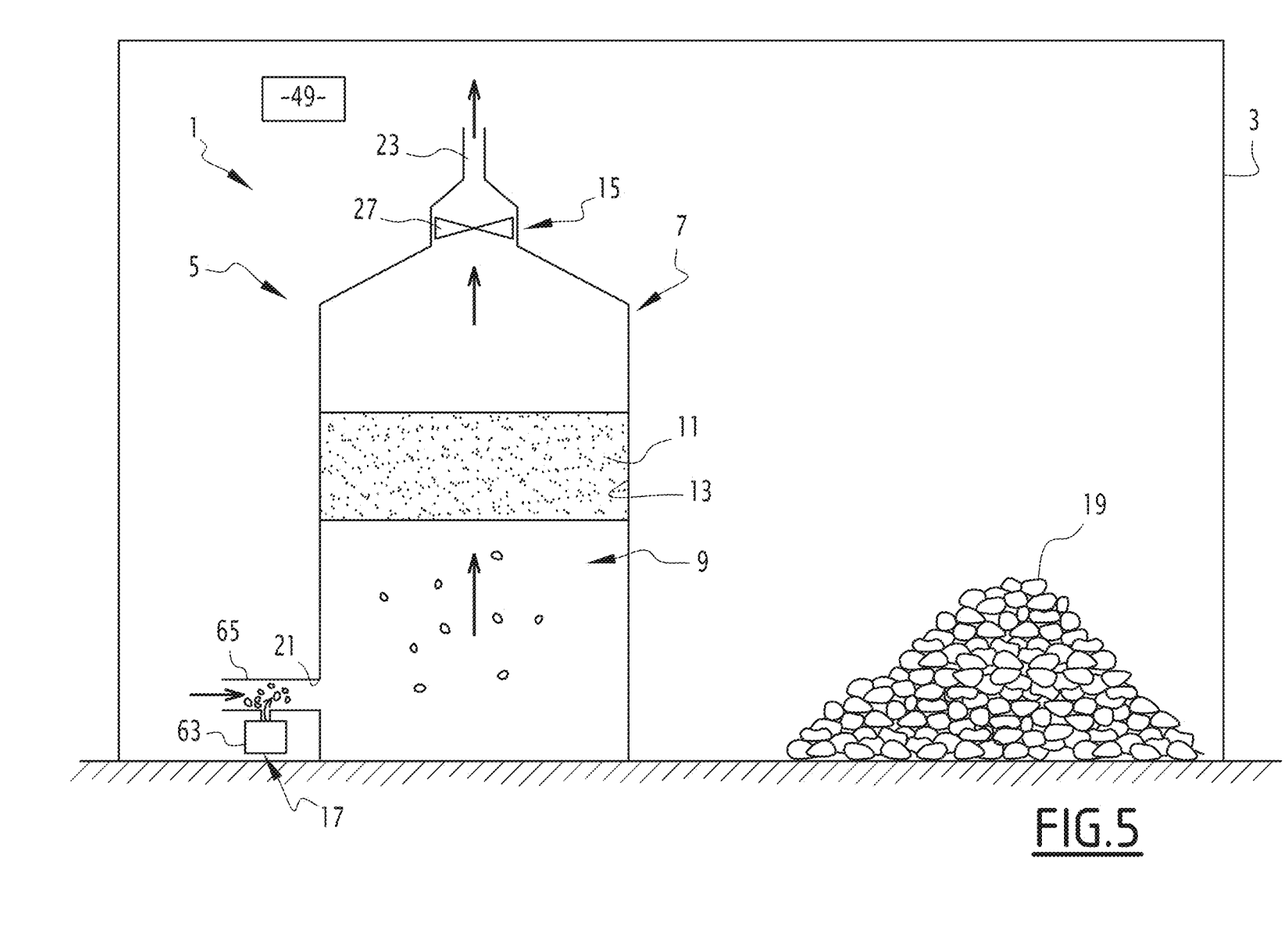

In the embodiment of FIG. 5, the recharging device 17 includes a nebulizing device 63, injecting the liquid in the form of droplets into the gas upstream from the material with a large specific surface 11.

The nebulization device 63 is of any suitable type. It produces a mist of fine droplets, for example obtained by a pressure sprayer, or by spraying on a spinning disc, or by ultra vibration. Preferably, the nebulization device operates at a temperature below 50° C., i.e., at ambient temperature.

The liquid is for example injected into a pipe 65 emerging in the inlet 21. The material with a large specific surface 11 in this case occupies the entire inner section of the tower.

Part of the liquid droplets injected through the nebulizer 63 into the gas is evaporated before arriving at the material with a large specific surface 11. The rest of the droplets are absorbed by the material with a large specific surface 11, which makes it possible to continuously re-impregnate this material with a large specific surface 11 with liquid. The gas stream traversing the material with a large specific surface 11 becomes charged with liquid vapor.

A third embodiment of the invention will now be described, in reference to FIG. 6. Only the differences between this third embodiment and the first embodiment will be described below. Identical elements, or elements performing the same function, will be designated using the same references in both embodiments.

Here, the evaporation device 5 is a hose, this hose inwardly defining the gas circulation pipe 9. The hose is of any suitable type. It typically has a section between 500 and 100,000 mm².

The material with a large specific surface 11 completely fills a segment of the circulation pipe 9, this segment defining the evaporation section 13.

The circulation device 15 includes a circulation member such as a fan or blower 67. For example, the circulation member 67 is inserted on the hose, upstream from the evaporation section 13. It discharges the gas toward the evaporation section 13.

Alternatively, the circulation member is placed downstream from the evaporation section 13.

The recharging device 17 advantageously comprises members 69 arranged to mount the evaporation section 13 reversibly in the circulation pipe.

In other words, the evaporation section 13 can be separated from the rest of the circulation pipe 9.

For example, the members 69 are flanges or any other appropriate member.

The evaporation section 13 is for example configured such that the spent material with a large specific surface 11 can be emptied from the hose segment. The latter is next filled with fresh material with a large specific surface, containing liquid. The evaporation section 13 is next placed back in the hose.

Alternatively, the segment making up the evaporation section 13 is disposable. This segment is then replaced by a new segment, containing a fresh material with a large specific surface, imbibed with liquid. The new evaporation section 13 is mounted back on the hose, in place of the old one.

This embodiment is particularly well suited to the case of a location 3 equipped with forced ventilation 71 working practically continuously. In this case, the location 3 is for example a grain silo having an air inlet 73 communicating with the outside and an air outlet 75 also communicating with the outside. The forced ventilation 71 is provided to ensure a circulation of air from the air inlet 73 to the air outlet 75 through the grains 77. An air distribution collector 79 is typically arranged in the silo, below the grains 77. The forced ventilation 71 comprises an air circulation member 81 such as a fan, the suction of which is connected to the air inlet 73 and the discharge to the collector 79.

The air outlet 75 is typically located in the upper part of the silo. During normal operation, the circulation member 81 suctions outside air, discharges it in the air collector 79, the air circulating to the air outlet 75 through the grains from the collector 79.

The evaporation unit 5 is placed outside the silo. It is arranged so as to suction the outside air and discharge the air charged with product vapor into a zone close to the air inlet 73. For example, the injection is done at the bottom of the chamber receiving the grains 77, in the collector 79. The injection is done at a low air flow rate. The injected air has a vapor concentration of each biocide and/or phytoprotective product preferably close to saturation.

For example, the segment defining the evaporation section 13 has a diameter of 300 mm and a length of one meter.

A fifth embodiment of the invention will now be described, in reference to FIG. 7.

Only the differences between the fifth embodiment and the fourth will be outlined below.

Elements that are identical or perform the same function in both embodiments will be designated using the same references.

In this embodiment, the hose segment making up the evaporation section cannot be disassembled. It is not provided to replace the spent material with a large specific surface with a new material with a large specific surface impregnated with liquid. On the contrary, the recharging device 17 is arranged to periodically re-impregnate the material with a large specific surface with liquid.

To that end, the recharging device 17 comprises a reserve 83 containing liquid, a liquid distributor 85, and a liquid circulation member 87 suctioning the liquid in the reserve 83 and discharging the liquid into the liquid distributor 85.

The liquid distributor is arranged to spray the liquid on or in the material with a large specific surface 11.

For example, the liquid distributor 85 is, as illustrated in FIG. 7, a perforated hose embedded in the material with a large specific surface 11. The perforated hose extends along the length of the evaporation section. It is for example placed along the axis of this segment.

Alternatively, the liquid distributor 85 includes several orifices drilled in the wall of the segment of the hose defining the evaporation segment, and supplied with liquid by a collector.

The computer 49 controls both the gas circulation member 69 and the liquid circulation member 87. It is programmed to perform liquid injections at a predetermined frequency. The quantity of liquid injected with each injection is also determined by the computer. The frequency of the injections is fixed, or alternatively is determined by the computer based on parameters such as the air flow rate.

Figure 9:
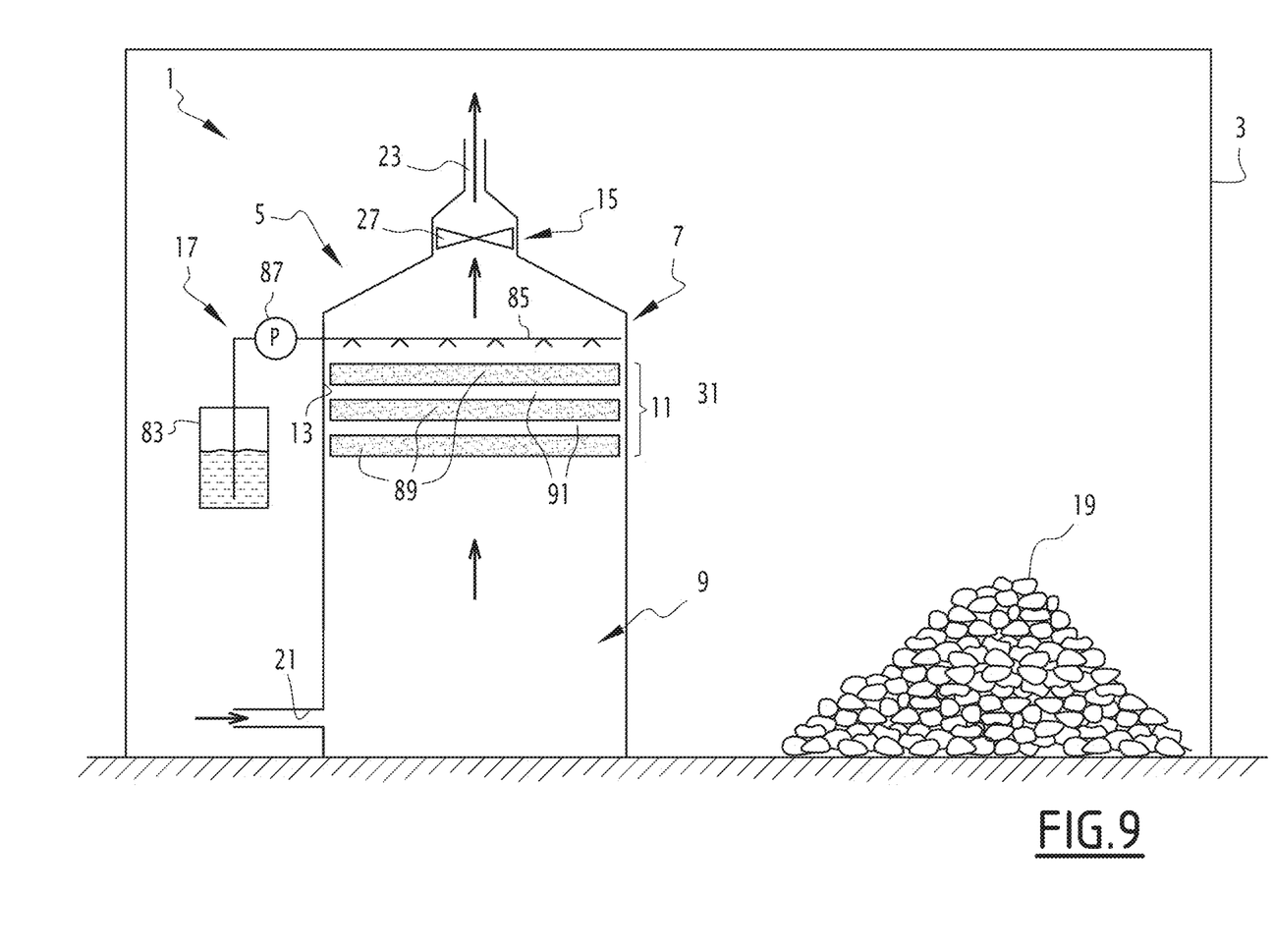

It should be noted that such a recharging device can also be used when the evaporation device is a tower (for example, see FIG. 9). The liquid distributor is then a ramp, for example placed above the material with a large specific surface.

An alternative of the first embodiment will now be described, in reference to FIG. 8. Only the points by which the treatment unit differs from that of FIG. 1 will be outlined below. Identical elements or elements performing the same function will be designated using the same references.

In this alternative, the material with a large specific surface 11 is arranged in at least two layers 89, positioned one above the other and separated from one another by a space 91.

Each layer 89 has a thickness below a predetermined limit, for example 100 mm.

Thus, the layers 89 are completely separated from one another, by the empty space 91. Each layer for example has a thickness of less than 50 mm, preferably less than 20 mm, still more preferably less than 15 mm. The layers 89 are typically parallel to one another.

The material with a large specific surface 11 can be arranged in two layers, three layers, or more than three layers superimposed on one another and separated from one another by spaces.

When the material with a large specific surface is opencell polyurethane foam, a height of about 13 mm is chosen for each layer.

This alternative embodiment offers the advantage of allowing excellent impregnation of the material with a large specific surface. Indeed, it has been observed that, irrespective of the impregnation mode of the material with a large specific surface by the liquid, the liquid accumulates at the bottom of the layer of material with a large specific surface, over a height of 10-15 mm determined by the gravity/capillary balance.

For example, if the material with a large specific surface 11 is open-cell polyurethane foam, if a polyurethane foam plate 25 mm thick is impregnated as described in reference to FIG. 1, the liquid is concentrated on an edge measuring thirteen mm thick, at the bottom of the polyurethane foam plate.

It is therefore particularly advantageous to arrange the material with a large specific surface in several layers, with the thickness chosen so as to allow impregnation of the entire layer, or substantially the entire layer, of material with a large specific surface.

It is thus possible to charge the material with a large specific surface with a larger quantity of liquid.

Figure 8:
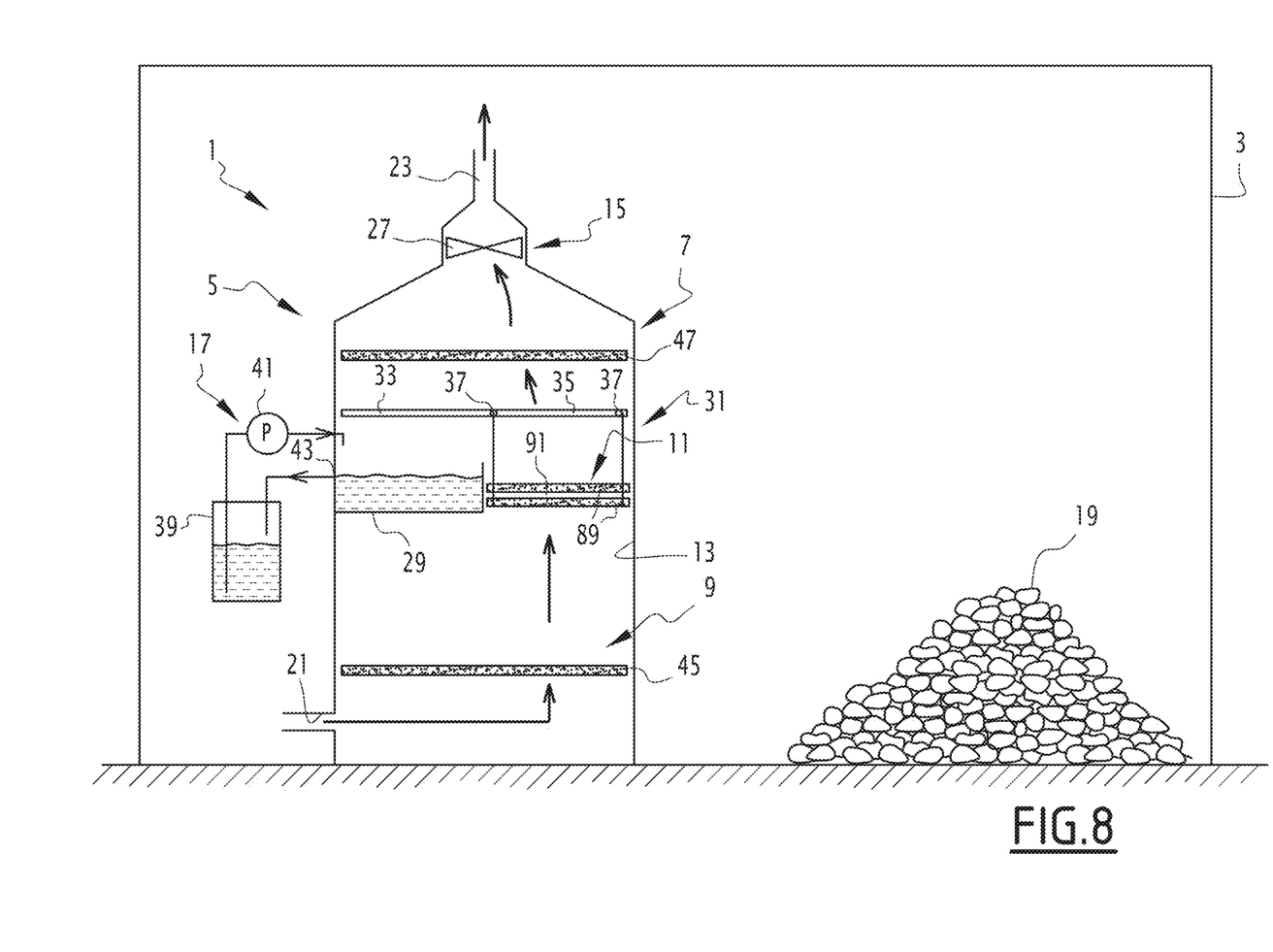

In the example shown in FIG. 8, the recharging device 12 is provided to extract all of the layers 89 of material with a large specific surface from the evaporation section 13, and to plunge them all in the tub 29.

Alternatively, only the upper layer(s) are removed from the evaporation section 13 and plunged in the tub 29 by the mechanism 31.

One alternative of the embodiment of FIG. 5 will now be outlined, in reference to FIG. 9. Only the points by which this alternative differs from the embodiment of FIG. 5 will be outlined below.

Identical elements or elements performing the same function will be designated using the same references.

In this alternative, the nebulization device 63 is replaced by the device comprising a liquid reserve 83, a liquid distributor 85 and a circulation member 87, which are described in reference to FIG. 7. The liquid distributor 85 is a spray bar, placed above the material with a large specific surface 11.

Furthermore, the material with a large specific surface 11 is arranged in several layers 89, here three layers, arranged below one another and separated from one another by spaces 91, as described in reference to FIG. 8.

The reimpregnation of the material with a large specific surface is done by spraying the liquid using the distributor 85, on the layer 89 located the highest.

Once the layer 89 located the highest is completely impregnated with liquid, the liquid sprayed by the distributor 85 can no longer be absorbed by the upper layer 89. The liquid then drips from the upper layer 89 on the layer 89 located immediately below it. Once the second layer is completely impregnated, the layer drips on the layer located below, etc. It is thus possible to re-impregnate all of the layers forming the material with a large specific surface 11.

It should be noted that the different embodiments and alternatives described above can be combined. Thus, the gas can undergo a washing step not only in the embodiment of FIGS. 1 to 3, but also in all of the other embodiments or alternatives.

The material with a large specific surface 11 can be recharged by a nebulization device also in the embodiments or alternatives of FIGS. 6, 7 and 9. The reimpregnation by the nebulization device can be done in addition to the reimpregnation devices described for FIGS. 1 to 4 and 6 to 9.

Likewise, it is possible to provide, for the evaporation devices of the tower type, that the spent material with a large specific surface is replaced by a new material with a large specific surface impregnated with liquid, and not re-impregnated as described relative to FIGS. 1 to 4.

In the alternative embodiment of FIG. 9, it is possible to provide a single liquid distributor with respect to the layers 89. It is also possible to provide several distributors, located above several layers 89, or above each layer 89.

According to a second aspect, the invention relates to a treatment method that comprises the following steps:

circulating a gas through a circulation pipe 9, a material with a large specific surface 11 filling an evaporation section 13 of the circulation pipe 9, a liquid impregnating the material with a large specific surface 11, the liquid containing at least one product or a mixture of volatile biocide and/or phytoprotective products, with a boiling temperature between 130 and 280° C. at atmospheric pressure, the material with a large specific surface having a liquid retention capacity greater than 50 L/m³ of material with a large specific surface at 20° C.;

when the material with a large specific surface 11 is spent in liquid, recharging, by re-impregnating the material with a large specific surface 11 with liquid, or replacing the spent material with a large specific surface 11 with a new material with a large specific surface 11 impregnated with liquid.

The treatment method is provided to be carried out in the treatment assemblies 5 described above.

The material with a large specific surface 11 is of the type described above.

According to one alternative embodiment, the re-impregnation of the material with a large specific surface 11 is done by plunging the material with a large specific surface 11 into a tub 29 containing liquid.

This reimpregnation is done as described above relative to FIGS. 1 to 3 and 8.

Advantageously, in this case, the circulation pipe 9 is arranged in a tower with a vertical axis, the tub 29 being placed in the tower, the evaporation section 13 being delimited between the tub 29 and the wall of the tower.

Such an arrangement has been described above.

Alternatively, the re-impregnation of the material with a large specific surface 11 is done by injecting the liquid in the form of droplets into the gas upstream from the material with a large specific surface 11, preferably at a temperature below 50° C.

Typically, the injection of the liquid in droplet form is done with a nebulization device, as described above in reference to FIG. 5.

According to another alternative, the re-impregnation of the material with a large specific surface 11 is done by spraying liquid on or in the material with a large specific surface 11, from a liquid reserve 83.

The liquid is for example sprayed in the material with a large specific surface through a drilled tube, embedded in the material with a large specific surface, as described in reference to FIG. 7. Alternatively, the liquid is sprayed on the material with a large specific surface 11, by a distributor for example assuming the form of a spray bar, arranged above the material with a large specific surface 11.

According to another alternative, the recharging is done by disassembling the evaporation section 13 of the circulation pipe 9, which contains the spent material with a large specific surface 11. The spent material with a large specific surface 11 is then replaced by a new material with a large specific surface impregnated with liquid, and the evaporation segment 13 is remounted in the circulation pipe 9.

This is particularly suitable for the case where the circulation pipe 9 is a hose, as shown in FIGS. 5 and 6.

According to still another alternative, the recharging is done by disassembling the evaporation section 13 of the circulation pipe 9, containing the spent material with a large specific surface 11, and remounting a new evaporation section 13 containing a new material with a large specific surface impregnated with liquid.

Again, this is particularly suitable for the case where the circulation pipe is a hose, as described in reference to FIG. 6.

Advantageously, the gas charged with vaporized liquid leaving the circulation pipe 9 is injected into a location 3.

As described above, the gas can be injected for disinfection purposes of the location. Alternatively, the gas is injected in order to apply a phytoprotective treatment. In this case, the location typically contains plant products, for which the phytoprotective treatment is intended.

In any case, the location is of the type described above.

What is claimed is:

1. A treatment unit, the unit comprising:
   an evaporator including a gas circulation pipe, and a material with a specific surface disposed in an evaporation section of the gas circulation pipe;
   a gas circulator configured to circulate gas through the gas circulation pipe;
   a liquid impregnating the material, the liquid containing at least one product or a mixture of volatile biocide or phytoprotective products, with a boiling temperature between 130 and 280° C. at atmospheric pressure, the material having a liquid retention capacity greater than 50 L/m3 at 20° C.; and
   a recharger arranged to re-impregnate the material with liquid or to replace the material with a new material with a specific surface impregnated with liquid,
   wherein the recharger comprises a tub containing liquid, and a mechanism arranged to remove the material from the evaporation section of the gas circulation pipe, plunge the material in the tub and return the material to the evaporation section of the gas circulation pipe.

2. The unit according to claim 1, wherein at least one of the products is chosen from the group consisting of essential oil; terpene; saturated or unsaturated C6 to C10 short chain alcohol; volatile synthetic product; liquid organic acids with a high boiling point; and esters with biocide activity.

3. The unit according to claim 1, wherein the evaporator comprises a vertical axis tower, the evaporation section having a vertical axis.

4. The unit according to claim 1, wherein the material comprises an open-cell foam or comprises a divided mineral material.

5. The unit according to claim 1, wherein the material is arranged in at least two layers positioned one above the other and separated from one another by a space, each layer having a thickness smaller than a predetermined limit.

6. The unit according to claim 1, wherein the evaporator comprises a vertical axis tower, the evaporation section having a vertical axis, wherein the tub is placed in the vertical axis tower, the evaporation section being disposed between the tub and the wall of the vertical axis tower.

7. A treatment method using the treatment unit according to claim 1, the method comprising:
   circulating a gas through the gas circulation pipe; and
   recharging, by re-impregnating the material with liquid, or replacing the material with a new material with a specific surface impregnated with liquid.

8. The method according to claim 7, wherein the material comprises an open-cell foam or comprises a divided mineral material.

9. The method according to claim 7, wherein the re-impregnation of the material is done by plunging the material into the tub containing liquid.

10. The method according to claim 9, wherein the gas circulation pipe is arranged in a tower with a vertical axis, the tub containing liquid being placed in the tower, the evaporation section of the gas circulation pipe being disposed between the tub containing liquid and the wall of the tower.

11. The method according to claim 7, wherein the liquid is vaporized, and the gas is charged with the vaporized liquid leaves the was circulation pipe and injected into a location containing plant products.

12. A unit for storing or growing plant products, comprising:

a location containing plant products; and the treatment unit according to claim 1, the gas circulation pipe being fluidly connected to the inner volume of the location.

13. A treatment unit, the unit comprising an evaporator including a gas circulation pipe, and a material with a specific surface disposed in an evaporation section of the gas circulation pipe;

a gas circulator configured to circulate gas through the gas circulation pipe;

a liquid impregnating the material, the liquid containing at least one product or a mixture of volatile biocide or phytoprotective products, with a boiling temperature between 130 and 280° C. at atmospheric pressure, the material having a liquid retention capacity greater than 50 L/m3 at 20° C.; and a recharger arranged to re-impregnate the material with liquid or to replace the material with a new material with a specific surface impregnated with liquid, wherein the evaporator comprises a hose defining the gas circulation pipe.

14. The unit according to claim 13, wherein the recharger comprises a reserve containing liquid, a liquid distributor, and a liquid circulator configured to suction the liquid in the reserve and discharge the liquid into the liquid distributor, the liquid distributor being arranged to spray the liquid on or in the material.

15. The unit according to claim 13, wherein the recharger comprises members arranged to mount the evaporation section reversibly in the gas circulation pipe.

16. A treatment method using the treatment unit according to claim 13, the method comprising:

circulating a gas through the was circulation pipe; and recharging, by re-impregnating the material with liquid, or replacing the material with a new material with a specific surface impregnated with liquid, wherein the re-impregnation of the material is done by spraying liquid from a liquid reserve on or in the material.

17. A treatment method using the treatment unit according to claim 13, the method comprising:

circulating a gas through the g circulation pipe; and recharging, by re-impregnating the material with liquid, or replacing the material with a new material with a specific surface impregnated with liquid, wherein the recharging is done by disassembling the evaporation section containing the material, replacing the material with a new material with a specific surface impregnated with liquid, and remounting the evaporation section containing the new material.

18. A treatment method using the treatment unit according to claim 13, the method comprising:

circulating a gas through the g circulation pipe; and recharging, by re-impregnating the material with liquid, or replacing the material with a new material with a specific surface impregnated with liquid, wherein the recharging is done by disassembling the evaporation section containing the material, and remounting a new evaporation section containing a new material with a specific surface impregnated with liquid.

19. A treatment unit, the unit comprising:

an evaporator including a gas circulation pipe, and a material with a specific surface disposed in an evaporation section of the gas circulation pipe;

a gas circulator configured to circulate gas through the gas circulation pipe;

a liquid impregnating the material, the liquid containing at least one product or a mixture of volatile biocide or phytoprotective products, with a boiling temperature between 130 and 280° C. at atmospheric pressure, the material having a liquid retention capacity greater than 50 L/m3 at 20° C.; and a recharger arranged to re-impregnate the material with liquid or to replace the material with a new material with a specific surface impregnated with liquid, wherein the recharger comprises a nebulizer configured to inject the liquid in the form of droplets into the gas upstream from the material.

* * * * *